though it is considered as being part of the invention.

United States Patent Office 3,532,588
Patented Oct. 6, 1970

3,532,588
NEEDLED NONWOVEN TEXTILE LAMINATE
Nicholas S. Newman, West Newton, Mass., assignor to
The Kendall Company, Boston, Mass., a corporation
of Massachusetts
Filed Apr. 12, 1967, Ser. No. 630,406
Int. Cl. B32b 7/04
U.S. Cl. 161—148         4 Claims

ABSTRACT OF THE DISCLOSURE

An unspun and unwoven fleece of textile fibers is needled through a layer of open-cell polymeric foam, which is then superimposed upon a layer of thermoplastic film. Heat is applied to melt the film, causing the film in part to be drawn up through the compacted needled fibrous bundles and to be distributed discontinuously throughout the foam, thus bonding fibers and foam together.

---

This application relates to improvements in the art of nonwoven fabrics made by needling a fleece of textile-length fibers into a layer of open-cell polymeric foam. The specific improvement involved is the creation of an improved bond between the fibrous layer and the foam layer, so that the fibers do not readily rub off or pluck out of the assembly.

Needled combinations of fibers and foam are known in the art and have been suggested for use as papermakers felts (U.S. Pat. 3,059,312); absorbent dressings (U.S. Pat. 3,122,141); and apparel linings (my copending application Ser. No. 376,140, filed June 18, 1964, now abandoned). Such combinations, generally herein referred to as laminates, have both absorbency and high insulating value, and their utility is widespread.

In the production of such laminates, an open-cell polymeric foam is generally employed because of its easier penetrability by the barbed needles of the needle loom, and because of its greater porosity. If closed-cell foam is used, the cell walls offer considerable resistance to needle penetration, heat is generated in the needles and polymer fusion to the needles may occur. Additionally, needled fiber-foam laminates using closed-cell foam have low porosity, and can transmit moisture or moisture vapor from one face to the other only through the needled fibrous bundles. Unfortunately, when textile fibers are needled through open-cell polymeric foams, the bundles of fibers thus formed are not securely bonded to the foam, which is comparatively fragile compared with closed-cell foams. If attempts are made to increase the bonding by means of repeated needling, the open-cell foam becomes fragmented and its insulating value depreciates. The use of adhesives to promote better bonding is open to the objections that it introduces a wet processing step, and that the distribution of the adhesive is difficult to control, some of it remaining in or migrating to the fibrous layer where its presence is undesirable.

It is with improvements in the art of bonding textile-length fibrous fleeces needled to open-cell polymeric foams that the present invention is concerned. It is a primary object of the invention to provide a method for bonding fibrous fleeces to open-cell foams by a dry process in which the bonding agent is distributed in a discontinuous manner throughout the assembly, portions of the fibers remaining substantially free of bonding agent.

Other objects of the invention will appear more fully from the following description and drawings, in which:

FIGS. 1, 2, and 3 are stylized concepts of stages of the process, FIG. 1 representing a fleece of textile-length fibers superimposed upon a layer of open-cell polymeric foam.

The process may be summarized as follows:

(1) A fleece of textile-length fibers is plied with a layer of open-cell foam.

(2) Some of the fibers are reoriented by a needling operation into fibrous bundles extending through the foam and penetrating through the bottom surface thereof.

(3) A film of thermoplastic material of lower melting point than the foam or the fibers is applied to the lower surface of the foam, making contact with the ends of the fibrous bundles protruding through the bottom foam surface.

(4) The three-ply assembly is heated to the point where the film is at least partly liquefied, whereup the fluid film substance is at least in part drawn up into the foam and into the segments of the fibers which constitute the capillary fibrous bundles, but not into the top fibrous layer.

(5) The assembly is cooled, whereup the film substance resolidifies, binding the fibrous layer to the foam by means of film substance distributed in and adhered to the fibrous bundles and the foam.

Figure 1:
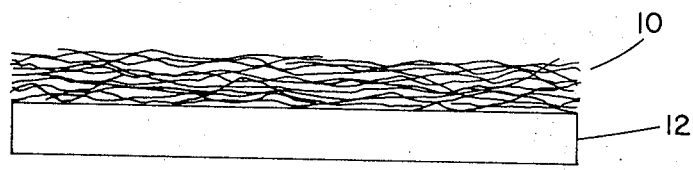

Referring to FIG. 1, there is shown a fleece of unspun and unwoven textile-length fibers 10 superimposed upon a layer of polymeric open-cell foam 12. By textile-length fibers is meant those fibers, natural or synthetic, which may be dry-assembled into a fibrous fleece or web by means of conventional textile dry-processing equipment such as cards, garnetts, air-lay machines, and the like. Usually such fibers will have an average staple length of at least one-half inch. Typical fibers include cotton, wool, viscose, acetate, nylon, polyester, polyacrylic and modified acrylics, and the like, the choice of fiber or fiber blend being governed by the end-uses to which the product is to be put, and by the film selected for bonding, since the fibers should not be adversely affected at the melting point of the film.

The fiber organization may be highly oriented, as from a card web, or it may be randomized or isotropic, or the fibers may be cross-laid by a cross-lay device.

The open-cell polymeric foam is of the type derived from natural or synthetic polymers such as polyurethanes of the ester or ether type, polyamides, rubber, polyvinyl chloride, and the like, the choice again being dictated by the properties of resilience, extensibility, porosity, etc., desired in the final product. As in the case of the fibers, the foam should be substantially unaffected upon exposure to temperatures at which the film melts. Polyurethane foams are commercially available in a wide variety of thicknesses and densities, and are the preferred foams of this invention. They are flexible and resilient, and are recognized as combining light weight with good thermal insulating properties, making them especially suitable when the products of this invention are used as garment linings. In general, I employ foams varying in thickness from 1/16 to 1/4 inch, although special applications may dictate departures from this preferred range.

Figure 2:
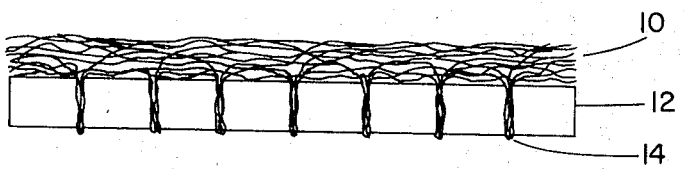
FIG. 2 represents the product of FIG. 1 after a part of the fibers have been needled through the foam layer.

In FIG. 2, some of the fibers of the fiber layer 10 have been needled into and through the foam layer 12. This is conveniently effected by use of a conventional needle loom, wherein a bank of barbed needles is thrust down through a fibrous web and a substrate of foam. By this operation, a portion of the fibers, enaged by the needles, are forcibly reoriented from their normal horizontal plane and are compacted into tufts or bundles, sometimes termed ligations, which are generally perpendicular to the principal plane of the fibers. This needling operation compacts the fibers in the bundle, so that the bundles have a high capillarity for fluid transfer compared with the uncompacted fibers constituting the unperturbed portion of the fibrous fleece 10. The density of needling is determined by the number of needles per square inch and by the number of strokes or times the needles are thrust into the fleece. My preferred range is to make between 150 and 500 penetrations per square inch. The needled bundles preferably extend through the foam so that they appear on the other face thereof, although they do not need to project substantially beyond the lower face of the foam.

Figure 3:
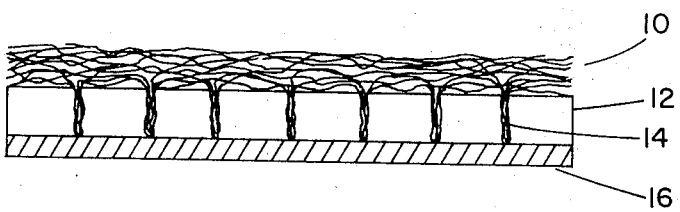
FIG. 3 represents the products of FIG. 2 with a layer of thermoplastic film in contact with the lower face of the foam layer.

Referring to FIG. 3, the needled combination of fibrous fleece and foam is shown superimposed upon a thermoplastic polymeric film 16, which the tips of the fibrous bundles 14 in contact with the film surface.

The particular thermoplastic film chosen for use should at least partially liquefy at temperatures which do not affect the foam or the fibers, so that it may at least in part be drawn up into the fibrous bundles by capillarity, and into the cells of the polymeric foam. Suitable films are polyolefins such as polyethylene and polypropylene, plasticized cellulose acetate, polyvinyl chloride, and the like.

The heating process may be accomplished by such procedures as passing the fiber-foam-film combination through a heated oven. More expedient is a calendering of the combination in such a way that the film comes in contact with a calender roll heated to a temperature sufficient to at least partially liquefy the film substance, rendering it sufficiently fluid to be drawn up into the interior of the combination by the capillary action of the compacted needled fibrous bundles.

Figure 4:
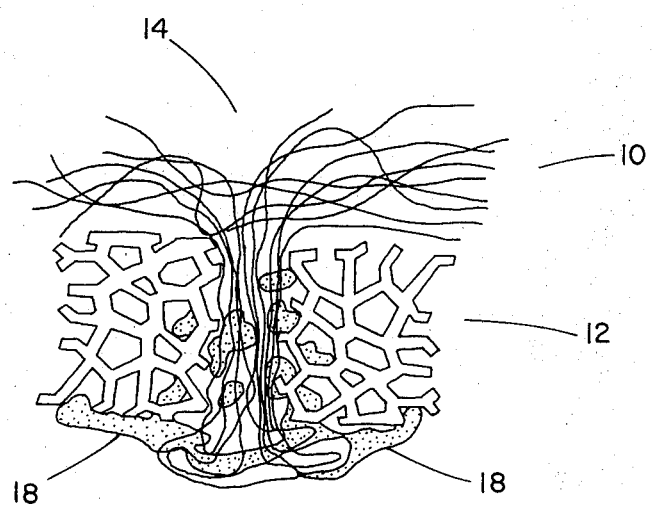
FIG. 4 is a cross-sectional view through one needled fibrous bundle in the final product, highly magnified.

FIG. 4 is a greatly enlarged cross-section view through a representative section of the final product. Of the fibers 10 in the upper layer, only a few are shown here, to enhance the clarity of detail. Of these fibers, a certain proportion have had a segment constituting a part of their length reoriented normal to the plane of the combination to form a compacted fibrous needled bundle 14.

This fibrous bundle extends downwardly through the open-cell foam layer 12 and to the remnants of what was the film layer. The film, as a result of the heating and resolidifying process, is now to an extent dispersed into numerous placques of thermoplastic substance 18, shown as stippled areas in FIG. 4. These placques adhere both to the fibers in the fibrous bundle 14, into which they have been drawn by capillarity, and to the walls of the open-cell foam 12.

The result is that the fibers which have been reoriented by the needling process are now bonded to one another and to the underlying foam layer. In this way, the fibers are locked into the structure in a way which cannot be achieved by needling alone, and the fibrous layer 10 of the combination is much more resistant to abrasion and to frictional forces which normally cause the fibers to shed or be plucked out.

The invention is illustrated by the following example.

EXAMPLE 1

A carded fleece of viscose rayon fibers, 3 denier, and weighing 25 grams per square yard, was needled to a layer of polyurethane foam 3/32 inch thick by passing the two components through a needle loom at 320 penetrations per square inch. The needle penetration was set at 0.2 inch, sufficient to cause the fibrous bundles to penetrate just through the lower surface of the foam.

The fiber-foam combination was then superimposed upon a layer of polypropylene film 0.87 mil thick, and the plied combination was run continuously through the nip of a calender at 1250 pounds pressure per inch of nip width. The film side was calendered against a steel roll heated to 310° F.: the fiber side was exposed to a cotton-filled roll heated to 180° F.

The final product in cross-section resembled that of FIG. 4, with rayon fibers bonded to polyurethane foam by placques or agglomerates of polypropylpene binder derived from the liquefied and resolidified film, said placques or agglomerates being distributed throughout the lower portion of the assembly, with the upper fibrous layer substantially free of bonding material other than that associated with the lower portion of the fibrous bundles. Nevertheless, the fibrous layer as a whole was firmly bonded to the foam layer, attempts to remove fibers by pulling them out ruptured either the foam structure or broke a portion of the fibers.

When the viscose rayon web was replaced by a 25 gram, 3 denier nylon fibrous web, in a similar experiment, substantially identical results were obtained.

Having thus described my invention, I claim:

1. The process of manufacturing a needled nonwoven textile laminate which comprises
    superimposing a fleece of unspun and unwoven textile-length fibers upon a layer of open-cell polymeric foam,
    needling at least a portion of said fibers through said foam, whereby at least a portion of said fibers are forcibly reoriented into a spaced-apart set of compact fibrous bundles extending through the foam in a direction normal to the plane of the fleece,
    bringing a thermoplastic film into contact with the lower surface of said foam and with the lower ends of said compact fibrous bundles,
    heating said film to cause it to liquefy at least in part in areas of said film which contact ends of said compact fibrous bundles, whereupon the fluid film substance is at least in part drawn up into the foam and into the segments of the fibers which constitute capillary fibrous bundles, but not into the top fibrous layer,
    and cooling the assembly to cause the liquefied portion of the film to remain distributed in discrete and separated aggregates of polymeric binder, thus binding the fibrous layer to the foam.

2. The process according to claim 1 wherein the liquefaction of the film substance is effected by the simultaneous application of heat and pressure to the assembly of fibers, foam, and film.

3. A needled nonwoven textile laminate which comprises
    a fleece of unspun and unwoven textile-length fibers superimposed upon and needled through a layer of open-cell polymeric foam,
    at least a portion of said fibers being organized into a set of compact fibrous bundles extending downwardly through said foam into a direction normal to the principal plane of the fibers,
    at least a portion of the fiber segments constituting said fibrous bundles being bonded to each other and to the open-cell foam by a solid polymeric binder material in the form of discrete and separated aggregates of polymeric binder distributed in and adherent to the fibrous bundles and the foam, the upper layer of textile fibers constituting the fleece being substantially free of polymeric binder.

4. The product according to claim 3 wherein the open-cell foam is polyurethane and the polymeric binder is a polyolefin.

References Cited

UNITED STATES PATENTS

| | | | |
|---|---|---|---|
| 2,429,486 | 10/1947 | Reinhardt | 161—180 X |
| 3,059,312 | 10/1962 | Jamieson | 161—151 X |
| 3,122,140 | 2/1964 | Crowe | 156—148 X |
| 3,122,141 | 2/1964 | Crowe | 156—148 X |
| 3,122,142 | 2/1964 | Crowe | 156—148 X |
| 3,156,242 | 11/1964 | Crowe | 156—148 X |
| 3,307,990 | 3/1967 | Homier et al. | 156—72 |
| 3,354,020 | 11/1967 | Copeland | 161—81 X |

ROBERT F. BURNETT, Primary Examiner

R. L. MAY, Assistant Examiner

U.S. Cl. X.R.

156—148, 306; 161—151, 159